(12) United States Patent
He

(10) Patent No.: US 12,363,714 B2
(45) Date of Patent: Jul. 15, 2025

(54) METHOD FOR TRANSMITTING CONTROL INFORMATION, ELECTRONIC DEVICE AND STORAGE MEDIUM

(71) Applicant: GUANGDONG OPPO MOBILE TELECOMMUNICATIONS CORP., LTD., Guangdong (CN)

(72) Inventor: Chuanfeng He, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 395 days.

(21) Appl. No.: 18/146,441

(22) Filed: Dec. 26, 2022

(65) Prior Publication Data
US 2023/0132121 A1 Apr. 27, 2023

Related U.S. Application Data

(63) Continuation of application No. PCT/CN2020/105893, filed on Jul. 30, 2020.

(51) Int. Cl.
*H04W 72/20* (2023.01)
*H04L 5/00* (2006.01)
*H04W 56/00* (2009.01)

(52) U.S. Cl.
CPC .......... *H04W 72/20* (2023.01); *H04L 5/0092* (2013.01); *H04W 56/00* (2013.01)

(58) Field of Classification Search
CPC . H04W 72/20; H04W 56/00; H04W 56/0015; H04L 5/0092; H04L 5/005; H04L 5/0053
See application file for complete search history.

(56) References Cited

U.S. PATENT DOCUMENTS

| | | |
|---|---|---|
| 10,270,573 B2 | 4/2019 | John Wilson |
| 10,523,476 B2 | 12/2019 | Sun |
| 10,791,550 B2 | 9/2020 | Ko |
| 2018/0198648 A1 | 7/2018 | Sun et al. |
| 2018/0337755 A1 | 11/2018 | John Wilson et al. |
| 2019/0223163 A1 | 7/2019 | Ko et al. |
| 2019/0288813 A1 | 9/2019 | John Wilson et al. |

(Continued)

FOREIGN PATENT DOCUMENTS

| | | |
|---|---|---|
| CN | 110169003 A | 8/2019 |
| CN | 110603852 A | 12/2019 |

(Continued)

OTHER PUBLICATIONS

Supplementary European Search Report in the corresponding European Patent application No. 20946872.7, mailed on Jun. 20, 2023.

(Continued)

*Primary Examiner* — Rina C Pancholi
(74) *Attorney, Agent, or Firm* — Ladas & Parry, LLP

(57) ABSTRACT

Provided are a method for transmitting control information, which includes that: a terminal device determines a first synchronization raster from at least two synchronization rasters allowed in a channel bandwidth, and determine information of a control resource set based on the first synchronization raster. Another method for transmitting control information, an electronic device and a storage medium are also provided.

14 Claims, 8 Drawing Sheets

A terminal device determines a first synchronization raster from at least two synchronization rasters allowed in a channel bandwidth — S201

The terminal device determines information of a control resource set based on the first synchronization raster — S202

(56) References Cited

U.S. PATENT DOCUMENTS

| | | |
|---|---|---|
| 2019/0289530 A1 | 9/2019 | Ko et al. |
| 2020/0021999 A1* | 1/2020 | Park .................. H04W 74/0808 |
| 2020/0084739 A1 | 3/2020 | Si et al. |
| 2020/0204411 A1 | 6/2020 | Sun et al. |
| 2021/0037488 A1 | 2/2021 | Ko |
| 2021/0195663 A1* | 6/2021 | Da Silva ........... H04W 36/0058 |
| 2022/0038916 A1 | 2/2022 | Park |
| 2022/0217662 A1* | 7/2022 | Jiang ................. H04W 72/1273 |

FOREIGN PATENT DOCUMENTS

| | | |
|---|---|---|
| CN | 111106895 A | 5/2020 |
| WO | 2019216690 A1 | 11/2019 |

OTHER PUBLICATIONS

Ericsson, "Initial access signals and channels", 3GPP TSG-RAN WGI Meeting #99 R1-1912706, Nov. 9, 2019 (Nov. 9, 2019), all pages.

Ericsson, "Initial access signals and channels", 3GPP TSG-RAN WG1 Meeting #98bis R1-1910944, Oct. 8, 2019 (Oct. 8, 2019), all pages.

International Search Report in the international application No. PCT/CN2020/105893, mailed on Apr. 23, 2021.

Written Opinion of the International Search Authority in the international application No. PCT/CN2020/105893, mailed on Apr. 23, 2021.

3GPP TS 38.213 V16.1.0 (Mar. 2020), 3rd Generation Partnership Project; Technical Specification Group Radio Access Network; NR; Physical layer procedures for control(Release 16), all pages.

3GPP TSG-RAN WG4 Meeting #93 R4-1915982, Reno, US, Nov. 18-22, 2019; Title: Draft CR for Sync raster design for NR-U in 38.104; Source to WG: Futurewei, all pages.

* cited by examiner

METHOD FOR TRANSMITTING CONTROL INFORMATION, ELECTRONIC DEVICE AND STORAGE MEDIUM

REFERENCE TO RELATED APPLICATION

This is a continuation application of International Patent Application No. PCT/CN2020/105893 filed on Jul. 30, 2020, the disclosures of which are incorporated herein by reference in their entireties.

TECHNICAL FIELD

The present disclosure relates to the technical field of wireless communication, in particular to a method for transmitting control information, an electronic device and a storage medium.

BACKGROUND

In related art, it is clear how to transmit control information such as a control resource set in a case that a plurality of synchronization rasters are allowed in a channel bandwidth.

SUMMARY

The embodiments of the present disclosure provide a method for transmitting control information, an electronic device and a storage medium, which specify how to transmit control information in a case that a plurality of synchronization rasters are allowed in a channel bandwidth.

In a first aspect, the embodiments of the present disclosure provide a method for transmitting control information, which may include that: a terminal device determines a first synchronization raster from at least two synchronization rasters allowed in a channel bandwidth, and determines information of a control resource set based on the first synchronization raster.

In a second aspect, the embodiments of the present disclosure provide a method for transmitting control information, which may include that: a network device sends a Synchronization Signal Block (SSB), the SSB being configured for a terminal device to determine a first synchronization raster from at least two synchronization rasters allowed in a channel bandwidth, and the first synchronization raster being configured to determine information of a control resource set.

In a third aspect, the embodiments of the present disclosure provide a terminal device. The terminal device may include: a processing unit, configured to determine a first synchronization raster from at least two synchronization rasters allowed in a channel bandwidth, and determine information of a control resource set based on the first synchronization raster.

In a fourth aspect, the embodiments of the present disclosure provide a network device. The network device may include: a sending unit, configured to send an SSB, the SSB being configured for a terminal device to determine a first synchronization raster from at least two synchronization rasters allowed in a channel bandwidth, and the first synchronization raster being configured to determine information of a control resource set.

In a fifth aspect, the embodiments of the present disclosure provide a terminal device, which may include: a processor and a memory configured to store a computer program runnable on the processor. Herein, the processor may be configured to perform the operations of the method for transmitting control information implemented by the above terminal device.

In a sixth aspect, the embodiments of the present disclosure provide a network device, which may include: a processor and a memory configured to store a computer program runnable on the processor. Herein, the processor may be configured to perform the operations of the method for transmitting control information implemented by the above network device.

In a seventh aspect, the embodiments of the present disclosure provide a chip, which may include: a processor, configured to call and run a computer program from a memory to enable a device installed with the chip to perform the method for transmitting control information implemented by the above terminal device.

In an eighth aspect, the embodiments of the present disclosure provide a chip, which may include: a processor, configured to call and run a computer program from a memory to enable a device installed with the chip to perform the method for transmitting control information implemented by the above network device.

In a ninth aspect, the embodiments of the present disclosure provide a storage medium, storing an executable program. The executable program, when run by a processor, executes the method for transmitting control information implemented by the above terminal device.

In a tenth aspect, the embodiments of the present disclosure provide a storage medium, storing an executable program. The executable program, when run by a processor, executes the method for transmitting control information implemented by the above network device.

In an eleventh aspect, the embodiments of the present disclosure provide a computer program product, which may include: a computer program instruction. The computer program instruction enables a computer to execute the method for transmitting control information performed by the above terminal device.

In a twelfth aspect, the embodiments of the present disclosure provide a computer program product, which may include: a computer program instruction. The computer program instruction enables a computer to execute the method for transmitting control information performed by the above network device.

In a thirteenth aspect, the embodiments of the present disclosure provide a computer program, enabling a computer to execute the method for transmitting control information performed by the above terminal device.

In a fourteenth aspect, the embodiments of the present disclosure provide a computer program, enabling a computer to execute the method for transmitting control information performed by the above network device.

According to the methods for transmitting control information, the electronic devices and the storage mediums provided by the embodiments of the present disclosure, a terminal device may determine a first synchronization raster from at least two synchronization rasters allowed in a channel bandwidth, and determine information of a control resource set based on the first synchronization raster. In this way, it is clear that in a case that a plurality of synchronization rasters are allowed in a channel bandwidth, a terminal device may determine a first synchronization raster configured to determine a second Resource Block (RB) offset, and then determine information of the control resource set based on the first synchronization raster, so that the control information can be transmitted in a case that the plurality of synchronization rasters are allowed in the channel bandwidth.

DETAILED DESCRIPTION

Figure 1:
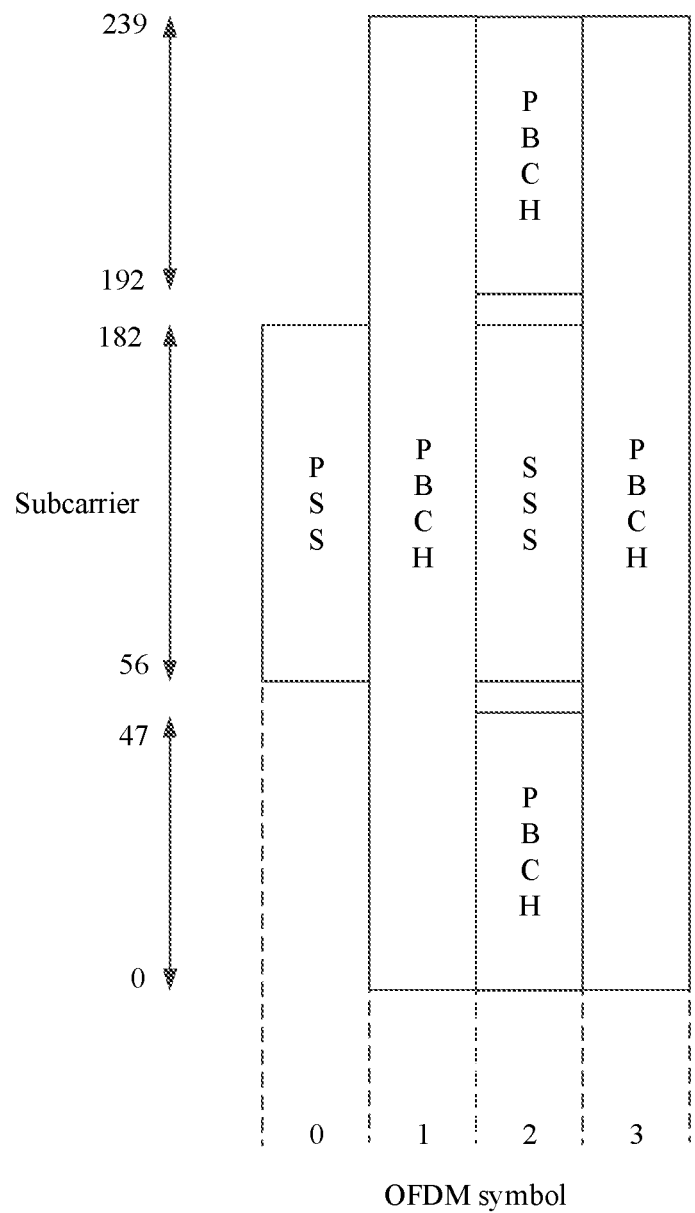
FIG. 1 is a schematic structural diagram of an SSB of the present disclosure.

In order to provide a more detailed understanding of the features and technical contents of the embodiments of the present disclosure, the implementation of the embodiments of the present disclosure will be described in detail below with reference to the accompanying drawings, and the accompanying drawings are for illustrative purposes only and are not intended to limit the embodiments of the present disclosure.

Before the description of the embodiments of the present disclosure, relevant contents are briefly described.

An unlicensed (license-free) spectrum is a nationally and regionally allocated spectrum that is available for communication among radio devices. The spectrum is generally considered as a shared spectrum, that is, communication devices in different communication systems may use the spectrum as long as regulatory requirements set by a country or region on the spectrum are met, and there is no need to apply to the government for a proprietary spectrum license. In order to enable friendly coexistence of various communication systems for wireless communication on the unlicensed spectrum, some countries or regions have specified regulatory requirements that are required be met for the use of the unlicensed spectrum. For example, in a European region, a communication device is required to follow a "Listen-Before-Talk (LBT)" principle, that is, the communication device needs to perform channel listening first before performing signal transmission on a channel at the unlicensed spectrum, and the communication device can perform signal transmission only when a channel listening result is channel being idle. When the channel monitoring result of the communication device on the channel at the unlicensed spectrum is channel being busy, the communication device may not perform signal transmission. In order to ensure fairness, the duration of signal transmission in one time by the communication device using a channel at the unlicensed spectrum may not exceed a Maximum Channel Occupation Time (MCOT).

At present, Nr-U technology in 3rd Generation Partnership Project (3GPP) Release 16 (Rel-16) is used in unlicensed bands below 7 GHz. In subsequent technological evolutions, the use of the unlicensed spectrum in higher bands as well as related technologies will be considered, such as 52.6 GHz-71 GHz discussed in the Rel-17 standard.

A Synchronization Signal (SS)/Physical Broadcast Channel (PBCH) block in a New Radio (NR) system is described below.

Public channels and signals in an NR system, such as SSs and broadcast channels, need to cover a whole cell by multi-beam scanning, so as to facilitate reception by a terminal device (User Equipment (UE)) in the cell. Multi-beam sending of the SS may be achieved by defining an SS/PBCH burst set. One SS burst set contains one or more SSs/PBCH blocks, and one SS block is configured to carry the SS and the broadcast channel of one beam. Thus, one SS burst set may contain SSs of beams in the cell, the quantity of the beams being a SS block number (the number of SS blocks). The maximum value L of the SS block number is related to the band of the system. Specifically, the value of L is 4 in the frequency range below 3 GHz; the value of L is 8 in the frequency range of 3 GHz to 6 GHz; and the value of L is 64 in the frequency range of 6 GHz to 52.6 GHz.

One SS/PBCH block (hereinafter referred to as an SSB) contains a Primary Synchronization Signal (PSS) of one symbol, a Secondary Synchronization Signal (SSS) of one symbol, and PBCHs of two symbols, as shown in FIG. 1. Herein, time-frequency resources occupied by the PBCH include a Demodulation Reference Signal (DMRS), configured to demodulate the PBCH.

All the SSs/PBCH blocks in a SS/PBCH burst set are sent in a 5 ms time window, and are repeatedly sent in a certain period. The period is configured by a high-level parameter SSB-timing, including 5 ms, 10 ms, 20 ms, 40 ms, 80 ms, 160 ms, etc. For a terminal device, an index of the SSB is obtained through a received SS/PBCH block, and the SSB index corresponds to a relative position of the SSB in the 5 ms time window based on the information and a half-frame indication carried in the PBCH, or frame synchronization. The index of the SS/PBCH block is indicated by the DMRS of the PBCH or information carried by the PBCH. In a licensed spectrum, for example, in a band below 6 GHz, the SSB burst contains at most 8 SSBs, and the values of the SSB index are 0-7. In an NR system using a licensed spectrum, the SSB index may be configured to obtain frame synchronization and a Quasi Co-Located (QCL) relationship. For the former, frame synchronization is obtained by obtaining the position of the SSB in a radio frame based on the SSB index and the half-frame indication.

For a frequency domain position of an SSB, the standard defines a frequency domain position of a synchronization raster on which the SSB for initial access is located. For the licensed spectrum, spacing between synchronization rasters is 1.2 MHz or 1.44 MHz, corresponding to the frequency ranges of 0-3 GHz and 3-24.25 GHz respectively, as shown in Table 1 below.

TABLE 1

Global Synchronization Channel Number (GSCN) Parameters for Global Frequency Raster

| Frequency range | SS Block frequency position $SS_{REF}$ | GSCN | Range of GSCN |
|---|---|---|---|
| 0-3000 MHz | N * 1200kHz + M * 50 kHz, N = 1:2499, M ∈ {1, 3, 5} (Note 1) | 3N + (M − 3)/2 | 2-7498 |
| 3000-24250 MHz | 3000 MHz + N * 1.44 MHz N = 0:14756 | 7499 + N | 7499-22255 |

(Note 1)
The default value for operating bands with which only support SCS spaced channel raster(s) is M = 3.

For a position of a synchronization raster in the frequency range of 24.25 GHz-100 GHz, spacing between synchronization rasters is 17.28 MHz, as shown in the table below.

TABLE 2

GSCN Parameters for Global Frequency Raster

| Frequency range | SS block frequency position $SS_{REF}$ | GSCN | Range of GSCN |
|---|---|---|---|
| 24250-100000 MHz | 24250.08 MHz + N * 17.28 MHz, N = 0:4383 | 22256 + N | [22256-26639] |

The spacing between the synchronization rasters is small because the licensed bands support different channel bandwidths and band allocations, and it is needed to allow synchronization signal blocks to be sent at as many frequency domain positions as possible to deploy a cell. For the unlicensed spectrum, since the channel bandwidth of the unlicensed spectrum in the frequency range of 6 GHz-7 GHz is 20 MHz and is shared by a plurality of operators, there is no need to define positions of synchronization rasters in the channel bandwidth of 20 MHz, and the complexity of blind detection of UE may be reduced by reducing the positions of the synchronization rasters. There is only one allowed synchronization raster per 20 MHz defined in the Rel-16 standard.

The information carried by the PBCH channel includes Master information block (MIB) information, 8-bit information in physical layer information, a physical layer System Frame Number (SFN), a half-frame indication, an SSB index, etc. The MIB information carried by the PBCH includes a 6-bit SFN information field, a 1-bit subcarrier spacing information field, a 4-bit SSB subcarrier offset (ssb-SubcarrierOffset) information field, an 8-bit pdcch-ConfigSIB1 information field, etc. The 8-bit pdcch-ConfigSIB1 information field is configured to indicate scheduling information about a Physical Downlink Shared Channel (PDSCH) carrying the SIB1 and search space information of a Physical Downlink Control Channel (PDCCH).

Figure 2:
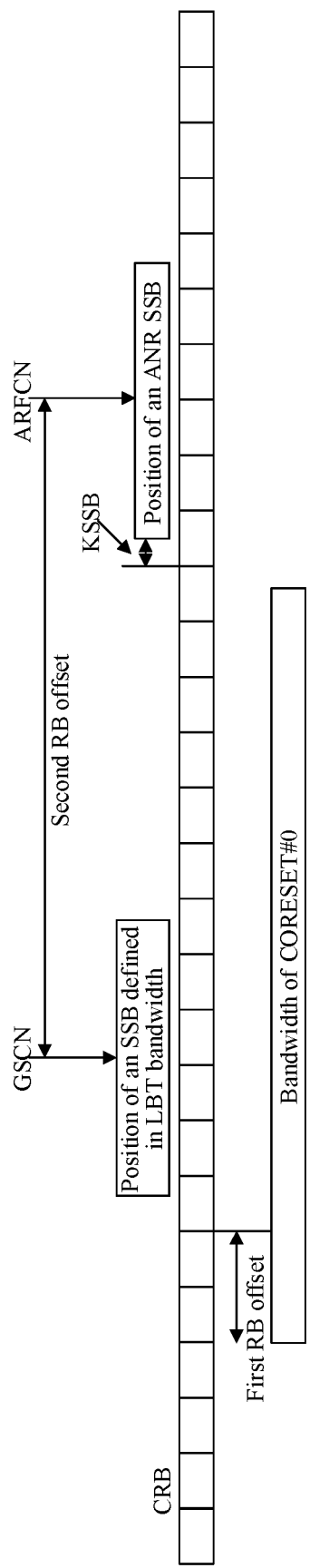
FIG. 2 is a schematic diagram of receiving System Information Block Type1 (SIB1) through a secondary cell of the present disclosure.

For reception of SIB1, in an initial access process, a terminal device receives the SIB1 in a primary cell. In an NR-U system, there is also a case that the SIB1 is received in a secondary cell, which is intended to support an Automatic Neighbour Relations (ANR) function in the NR-U system, so as to solve the problem that a Physical Cell Identifier (PCI) conflict may occur when different operators deploy a cell. Since the ANR function depends on acquisition of the SIB1, the reception of SIB1 needs to be supported in the secondary cell. After receiving the SIB1 of the secondary cell, the terminal device may report a Cell Global Identity (CGI) for the ANR function of network. In order to receive the SIB1 in the secondary cell, the terminal device needs to receive a SS/PBCH block configured in the secondary cell to obtain search space information of Type0-PDCCH. Since the secondary cell is not a cell for initial access, the frequency domain position of the SS/PBCH block configured to carry search space information of the Type0-PDCCH is not located on a synchronization raster, but is an Absolute Radio Frequency Channel Number (ARFCN) of the frequency domain position of an SSB configured by measuring configuration information, and such SSB is called an ANR SSB. In this case, how to obtain search space information of Type0-PDCCH through an SS/PBCH block received on an asynchronization raster needs to be designed. A schematic diagram of receiving SIB1 through a secondary cell, as shown in FIG. 2, includes the following operations.

At operation 1, an ANR SS/PBCH block is detected, and a PBCH is decoded to obtain MIB information.

At operation 2, $\overline{k}_{SSB}$ is obtained by obtaining subcarrier offset information ssb-SubcarrierOffset that is based on the MIB information, and $k_{SSB}$ is determined based on $\overline{k}_{SSB}$.

Specifically, $\overline{k}_{SSB}$ is obtained based on ssb-SubcarrierOffset; and when $\overline{k}_{SSB} \geq 24$, $k_{SSB} = \overline{k}_{SSB}$, otherwise $k_{SSB} = 2 \cdot \lfloor \overline{k}_{SSB}/2 \rfloor$.

At operation 3, a boundary of a Common RB (CRB) is determined based on $k_{SSB}$.

At operation 4, a first RB offset is determined based on CORESET #0 information in the MIB.

At operation 5, a second RB offset is determined based on a frequency offset between the center frequency of the ANR SS/PBCH block and a GSCN of an allowed synchronization raster defined in the channel bandwidth.

At operation 6, a frequency domain position of the CORESET #0 is determined based on the first RB offset and the second RB offset.

The carrier bandwidth of the unlicensed spectrum used in the NR-U technology of Rel-16 is 20 MHz, and a plurality of 20 MHz may be bundled for use through carrier aggregation. The position of a synchronization raster where an SSB is located is predefined in each 20 MHz bandwidth. When SIB1 is received by a secondary cell for ANR, the resource position of CORESET #0 carried by the ANR SS/PBCH block is relative to the resource position of the SSB on a predefined synchronization raster in the 20 MHz bandwidth.

For the unlicensed spectrum in the frequency range of 52.6 GHz-71 GHz, a single channel bandwidth may reach 2.16 GHz, in which a plurality of synchronization rasters may be predefined, for example to support simultaneous transmission of a plurality of frequency divided SSBs, so as to solve Occupied Channel Bandwidth (OCB) problem involved in the transmission of the SSBs. However, how to obtain a control resource set through an ANR SSB has not yet been clear.

The technical solutions of the embodiments of the present disclosure may be applied to various communications systems, such as a Global System for Mobile Communications (GSM), a Code Division Multiple Access (CDMA) system, a Wideband Code Division Multiple Access (WCDMA) system, a General Packet Radio Service (GPRS) system, a LTE system, a Frequency Division Duplex (FDD) system, a Time Division Duplex (TDD) system, an Advanced Long Term Evolution (LTE-A) system, an NR system, an evolution system of the NR system, an LTE-based Access to Unlicensed Spectrum (LTE-U) system, a NR-based Access to Unlicensed Spectrum (NR-U) system, a Universal Mobile Telecommunications System (UMTS), a Worldwide Interoperability for Microwave Access (WiMAX) communications system, a Wireless Local Area Network (WLAN), Wireless Fidelity (WiFi), a next generation of communication systems, or other communication systems.

System architecture and service scenarios described in the embodiments of the present disclosure are intended to describe the technical solutions in the embodiments of the present disclosure more clearly, but are not intended to limit the technical solutions provided in the embodiments of the present disclosure. Those of ordinary skill in the art may know that as the network architecture evolves and a new service scenario emerges, the technical solutions provided in the embodiments of the present disclosure are also applicable to a similar technical problem.

The network device involved in the embodiments of the present disclosure may be a common base station (NodeB (NB) or Evolutional Node B (eNB) or gNB), a NR controller, a centralized unit, a NR base station, a remote radio frequency module, a micro base station, a relay, a distributed unit, a Transmission Reception Point (TRP), a Transmission Point (TP) or any other devices. No limits are made to specific technologies and specific device forms adopted by the network device in the embodiments of the present disclosure. In order to facilitate description, in all embodiments of the present disclosure, the above apparatuses with a wireless communication function provided for the terminal device are collectively referred to a network device.

In the embodiments of the present disclosure, the terminal device may be any terminal. For example, the terminal device may be UE in Machine Type Communication (MTC). That is to say, the terminal device may also be called UE, a Mobile Station (MS), a mobile terminal, a terminal, etc. The terminal device may communicate with one or more central networks (CNs) through a radio access network (RAN). For example, the terminal device may be a mobile terminal (or referred to as a "cellular" phone) and a computer with a mobile terminal. For example, the terminal device may also be a portable, pocket-sized, hand-held, computer built-in, or in-vehicle mobile apparatus, which exchanges language and/or data with the RAN. No specific limits are made thereto in the embodiments of the present disclosure.

In some embodiments, the network device and the terminal device may be deployed on land, including indoors or outdoors, or may be held in hands or deployed in vehicles, or may be deployed on water, or may be deployed on an aircraft, a balloon and an artificial satellite in the air. No limits are made to the present disclosure scenario of the network device and the terminal device in the embodiments of the present disclosure.

In some embodiments, communication may be performed between the network device and the terminal device as well as between terminal devices through a licensed spectrum, or through an unlicensed spectrum, or through the licensed spectrum and the unlicensed spectrum simultaneously. Communication may be performed between the network device and the terminal device as well as between the terminal devices through a spectrum below 7 gigahertz (GHz), or through a spectrum above 7 GHz, or through the spectra below 7 GHz and above 7 GHz simultaneously. No limits are made to the spectrum resource used between the network device and the terminal device in the embodiments of the present disclosure.

Generally speaking, traditional communication systems support a limited number of connections and are easy to implement. However, with the development of the communication technology, mobile communication systems will not only support traditional communication, but also support, for example, Device to Device (D2D) communication, Machine to Machine (M2M) communication, MTC, and Vehicle to Vehicle (V2V) communication, etc. The embodiments of the present disclosure may also be applied to these communication systems.

Figure 3:
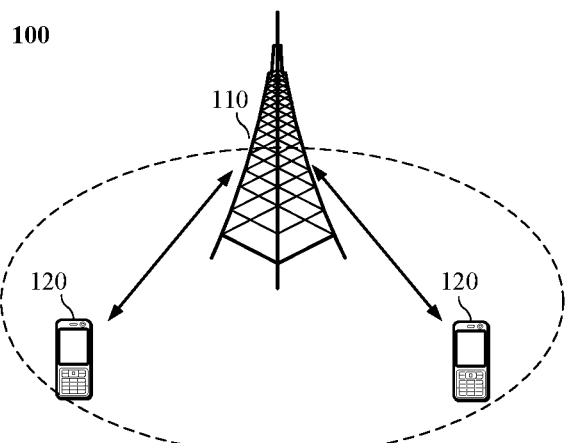
FIG. 3 is a schematic diagram of a composition structure of a communication system according to an embodiment of the present disclosure.

In an example, a communication system 100 applied in the embodiments of the present disclosure is shown in FIG. 3. The communication system 100 may include a network device 110, and the network device 110 may be a device communicating with a terminal device 120 (or called a communication terminal and a terminal). The network device 110 may provide communication coverage for a specific geographical region and may communicate with a terminal device located in the coverage. In some embodiments, the network device 110 may be a Base Transceiver Station (BTS) in the GSM or the CDMA system, may also be a NB in the WCDMA system, and may further be an eNB or eNodeB in the LTE system or a wireless controller in a Cloud Radio Access Network (CRAN). Alternatively, the network device may be a mobile switching center, a relay station, an access point, a vehicle device, a wearable device, a hub, a switch, a network bridge, a router, a network-side device in a 5G network, a network device in a future evolved Public Land Mobile Network (PLMN) or the like.

The communication system 100 further includes at least one terminal device 120 within the coverage of the network device 110. A "terminal device" used herein includes, but not limited to, a device arranged to receive/send a communication signal through a wired line connection, for example, through Public Switched Telephone Network (PSTN), Digital Subscriber Line (DSL), digital cable and direct cable connections, and/or another data connection/network) and/or through a wireless interface, for example, for a cellular network, a WLAN, a digital television network like a Digital Video Broadcasting-Handheld (DVB-H) network, a satellite network and an Amplitude Modulated (AM)-Frequency Modulated (FM) broadcast transmitter, and/or another communication terminal, and/or an Internet of Things (IoT) device. The terminal device arranged to communicate through a wireless interface may be called a "wireless communication terminal", a "wireless terminal" or a "mobile terminal". Examples of a mobile terminal include, but not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN or the like.

In some embodiments, the terminal device 120 may perform D2D communication.

In some embodiments, the 5G system or the 5G network may also be called an NR system or an NR network.

FIG. 3 exemplarily shows one network device and two terminal devices. In some embodiments, the communication system 100 may include a plurality of network devices and another number of terminal devices that may be included in coverage of each network device. There are no limits made thereto in the embodiments of the present disclosure.

In some embodiments, the communication system 100 may further include other network entities such as a network controller and a mobility management entity. There are no limits made thereto in the embodiments of the present disclosure.

It should be understood that a device with a communication function in the network/system in the embodiments of the present disclosure may be called a communication device. Taking the communication system 100 shown in FIG. 3 as an example, communication devices may include the network device 110 and terminal device 120 with the communication function, and the network device 110 and the terminal device 120 may be the specific devices mentioned above and will not be elaborated herein. The communication devices may further include other devices in the communication system 100, for example, other network entities like a network controller and a mobility management entity. There are no limits made thereto in the embodiments of the present disclosure.

Figure 4:
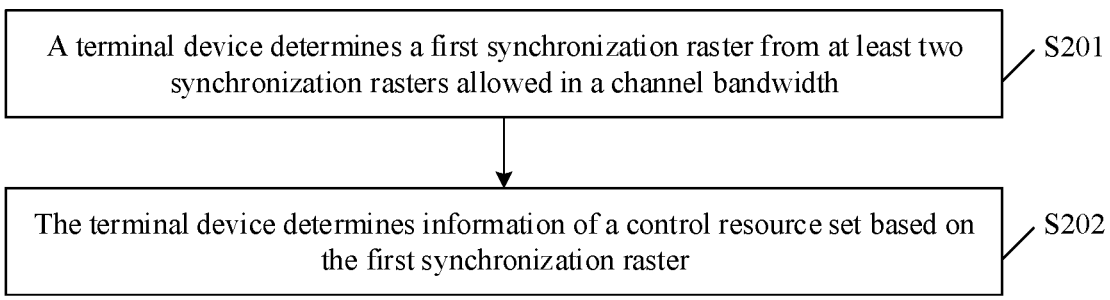
FIG. 4 is a schematic diagram of an optional processing flow of a method for transmitting control information according to an embodiment of the present disclosure.

An optional processing flow of a method for transmitting control information according to an embodiment of the present disclosure, as shown in FIG. 4, includes the following operations.

At operation S201, a terminal device determines a first synchronization raster from at least two synchronization rasters allowed in a channel bandwidth.

In some embodiments, in a case that the number of synchronization rasters allowed in the channel bandwidth is greater than or equal to two, the first synchronization raster needs to be determined from the plurality of synchronization rasters, the first synchronization raster being configured to determine information of a control resource set.

In some embodiments, the terminal device may determine the first synchronization raster from the at least two synchronization rasters allowed in the channel bandwidth according to a preset rule, that is, the first synchronization raster is predefined. In a specific implementation, the preset rule may be agreed by a protocol, or agreed by the terminal device negotiating with a network device. In other embodiments, the terminal device may determine the first synchronization raster based on indication information in an SSB detected by the terminal device. The two ways of determining the first synchronization raster are described separately below.

Mode 1: in the case that the first synchronization raster is predefined, the first synchronization raster may be a synchronization raster with the highest frequency among the synchronization rasters allowed in the channel bandwidth. Alternatively, the first synchronization raster may be a synchronization raster with the lowest frequency among the synchronization rasters allowed in the channel bandwidth. Alternatively, when N synchronization rasters are allowed in the channel bandwidth and N is an odd number, the first synchronization raster may be the (N+1)/2-th synchronization raster in the N synchronization rasters arranged in order of frequency size. Alternatively, when N synchronization rasters are allowed in the channel bandwidth and N is an even number, the first synchronization raster may be the N/2-th synchronization raster in the N synchronization rasters arranged in order of frequency size. Alternatively, when N synchronization rasters are allowed in the channel bandwidth and N is an even number, the first synchronization raster may be the (N/2+1)-th synchronization raster in the N synchronization rasters arranged in order of frequency size. Alternatively, the first synchronization raster may be a synchronization raster satisfying a first relationship with the frequency position of the SSB detected by the terminal device. Alternatively, the first synchronization raster may be determined based on a PCI in the SSB detected by the terminal device.

For the case that the first synchronization raster is the synchronization raster with the highest frequency among the synchronization rasters allowed in the channel bandwidth, an example is illustrated: when the number of the synchronization rasters allowed in the channel bandwidth is N and the frequency relationship among the N synchronization rasters is $f_1<f_2<f_3< \ldots <f_N$, the synchronization raster corresponding to the frequency $f_N$ is the first synchronization raster.

For the case that the first synchronization raster is the synchronization raster with the lowest frequency among the synchronization rasters allowed in the channel bandwidth, an example is illustrated: when the number of synchronization rasters allowed in the channel bandwidth is N and the frequency relationship among the N synchronization rasters is $f_1<f_2<f_3< \ldots <f_N$, the synchronization raster corresponding to the frequency $f_1$ is the first synchronization raster.

For the case that when N synchronization rasters are allowed in the channel bandwidth and N is an odd number, the first synchronization raster is the (N+1)/2-th synchronization raster in the N synchronization rasters arranged in order of frequency size, an example is illustrated: when the number of the synchronization rasters allowed in the channel bandwidth is seven, the frequencies corresponding to the seven synchronization rasters are arranged in the order from high to low or from low to high, and then the third synchronization raster is determined to be the first synchronization raster.

For the case that when N synchronization rasters are allowed in the channel bandwidth and N is an even number, the first synchronization raster is the N/2-th synchronization raster in the N synchronization rasters arranged in order of frequency size, an example is illustrated: when the number of synchronization rasters allowed in the channel bandwidth is eight, the frequencies corresponding to the eight synchronization rasters are arranged in the order from high to low or from low to high, and then the fourth synchronization raster is determined to be the first synchronization raster.

For the case that when N synchronization rasters are allowed in the channel bandwidth and N is an even number, the first synchronization raster is the (N/2+1)-th synchronization raster in the N synchronization rasters arranged in order of frequency size, an example is illustrated: when the number of synchronization rasters allowed in the channel bandwidth is eight, the frequencies corresponding to the eight synchronization rasters are arranged in the order from high to low or from low to high, and then the fifth synchronization raster is determined to be the first synchronization raster.

For the case that the first synchronization raster is the synchronization raster satisfying the first relationship with the frequency position of the SSB detected by the terminal device, an example is illustrated: in some embodiments, the first relationship may be being closest to the frequency position of the SSB or being farthest from the frequency position of the SSB. Therefore, the first synchronization raster may be a synchronization raster corresponding to a frequency closest to the frequency position of the SSB detected by the terminal device. Alternatively, the first synchronization raster may be a synchronization raster corresponding to a frequency farthest from the frequency position of the SSB detected by the terminal device.

For the case that the first synchronization raster is determined based on the PCI in the SSB detected by the terminal device, an example is illustrated: in some embodiments, the first synchronization raster is a synchronization raster having a corresponding relationship with the PCI in the SSB detected by the terminal device. In a specific implementation, the PCI has the corresponding relationship with the first synchronization raster, which may be that a modulo operation result obtained by performing a modulo operation on the PCI based on the number of synchronization rasters allowed in the channel bandwidth has the corresponding relationship with the serial number of the first synchronization raster. When the number of synchronization rasters allowed in the channel bandwidth is five, a result obtained by performing modulo 5 operation on the PCI is 0, or 1, or 2, or 3, or 4. The five synchronization rasters allowed in the channel bandwidth may be numbered in advance according to the order from high to low of the frequency positions of the synchronization rasters, or, according to the order from low to high of the frequency positions of the synchronization rasters, for example, the serial numbers of the five synchronization rasters are respectively 0, 1, 2, 3 and 4. The synchronization rasters may also be numbered in other implementable ways, such as numbered to A, B, C. etc. Taking the five synchronization rasters with the serial numbers 0, 1, 2, 3 and 4 as an example, in response to the result obtained by performing modulo 5 operation on the PCI being 1, the terminal device determines that the first synchronization raster is the synchronization raster with the serial number 1.

Mode 2: the terminal device may determine the first synchronization raster based on indication information in the SSB detected by the terminal device. In some embodiments, the indication information may be configured to indicate a frequency position of the first synchronization raster.

Herein, no specific limits are made to the indication manner of the indication information in the embodiments of the present disclosure. For example, when the SSB is carried on a PBCH, the frequency position of the first synchronization raster may be indicated using a PBCH DMRS sequence, or the frequency position of the first synchronization raster may also be indicated using bit information in an information field carried in the PBCH.

At operation 202, information of a control resource set is determined based on the first synchronization raster.

In some embodiments, the terminal device may determine a second RB offset between a frequency corresponding to the detected SSB and a frequency corresponding to the first synchronization raster, and determine a first RB offset based on MIB information in the detected SSB; and a frequency domain position of the control resource set may be determined based on the first RB offset and the second RB offset. In a specific implementation, the terminal device may determine the information of the control resource set based on the first RB offset, the second RB offset, and search space information of Type0-PDCCH.

In some embodiments, when the terminal device determines the second RB offset between the frequency corresponding to the detected SSB and the frequency corresponding to the first synchronization raster, the terminal device may determine the second RB offset based on a center frequency corresponding to the SSB and a center frequency corresponding to the first synchronization raster, or may determine the second RB offset based on an edge frequency corresponding to the SSB and an edge frequency corresponding to the first synchronization raster, or may also be determine based on a common RB (CRB) corresponding to a RB of the SSB, such as determining the second RB offset based on a distance between CRBs corresponding to the first RB of the SSB.

Figure 5:
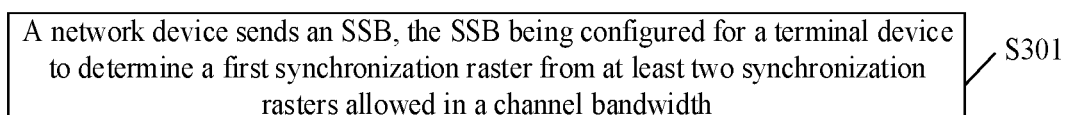
FIG. 5 is a schematic diagram of another optional processing flow of a method for transmitting control information according to an embodiment of the present disclosure.

Another optional processing flow of a method for transmitting control information according to an embodiment of the present disclosure, as shown in FIG. 5, includes the following operations.

At operation S301, a network device sends an SSB, the SSB being configured for a terminal device to determine a first synchronization raster from at least two synchronization rasters allowed in a channel bandwidth.

In some embodiments, the network device may send an SSB to the terminal device, the SSB being configured for the terminal device to determine a first synchronization raster from a plurality of synchronization rasters allowed in a channel bandwidth, and the first synchronization raster being configured to determine a frequency domain position of a control resource set.

In some embodiments, the SSB may include indication information, the indication information being configured to indicate a frequency position of the first synchronization raster. In other embodiments, a PCI carried in the SSB is configured to determine the first synchronization raster.

The PCI carried in the SSB is configured to determine a scene of the first synchronization raster, and the PCI has a corresponding relationship with the first synchronization raster. The corresponding relationship between the PCI and the first synchronization raster may include that: a modulo operation result obtained by performing modulo operation on the PCI based on the number of synchronization rasters allowed in the channel bandwidth has a corresponding relationship with the serial number of the first synchronization raster.

In a specific implementation, the serial number of the first synchronization raster is obtained based on frequency positions from high to low of the synchronization rasters. Alternatively, the serial number of the first synchronization raster is obtained based on frequency positions from low to high of the synchronization rasters.

For example, when the number of synchronization rasters is five, a result obtained by performing modulo 5 operation on the PCI may be 0, or 1, or 2, or 3, or 4. The five synchronization rasters allowed in the channel bandwidth may be numbered in advance according to the order from high to low of the frequency positions of the synchronization rasters, or according to the order from low to high of the frequency positions of the synchronization rasters, for example, the numbers of the five synchronization rasters are respectively 0, 1, 2, 3 and 4. The synchronization rasters may also be numbered in other implementable ways, such as numbered to A, B, C. etc. Taking the five synchronization rasters with the numbers 0, 1, 2, 3 and 4 as an example, in response to the result obtained by performing modulo 5 operation on the PCI being 1, the terminal device determines that the first synchronization raster is the synchronization raster with the serial number 1.

The specific implementation process of the method for transmitting control information provided by the embodiments of the present disclosure is described in detail below based on different ways of determining the first synchronization raster.

Figure 6:
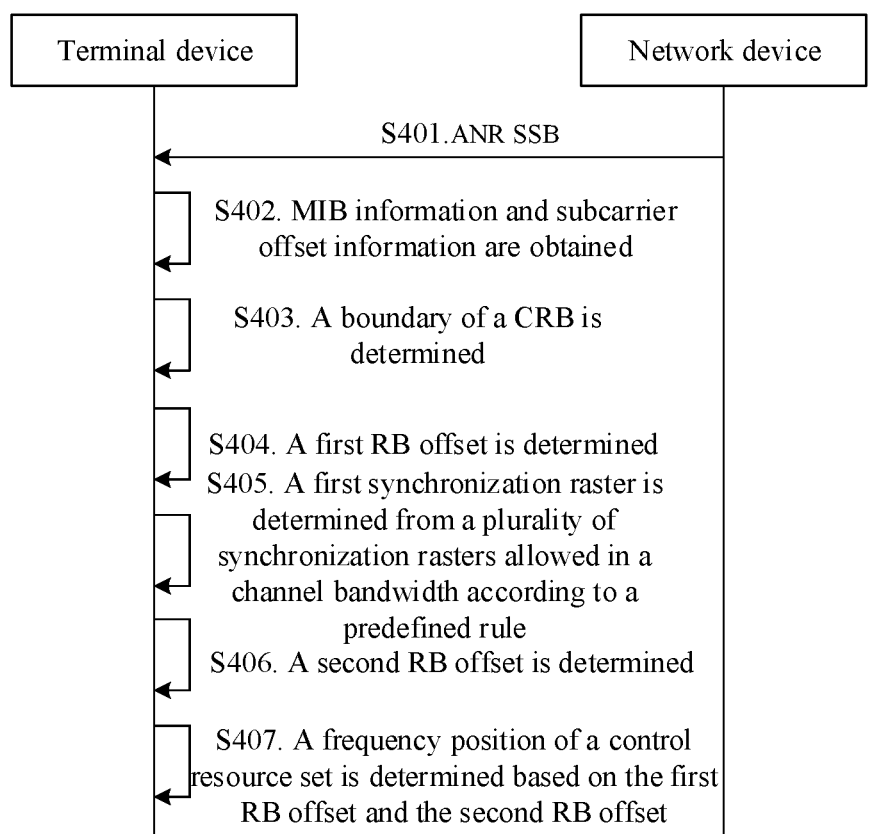
FIG. 6 is a schematic diagram of a detailed processing flow of a method for transmitting control information according to an embodiment of the present disclosure.

In the case that the first synchronization raster is determined in a predefined manner, a detailed processing flow of a method for transmitting control information according to an embodiment of the present disclosure, as shown in FIG. 6, includes the following operations.

At operation S401, the network device sends an ANR SS/PBCH block to the terminal device.

At operation S402, the terminal device decodes the PBCH to obtain MIB information, and obtains subcarrier offset information through the MIB information.

At operation S403, the terminal device determines a boundary of a CRB based on the subcarrier offset information.

At operation S404, the terminal device determines a first RB offset based on information of a common control resource set in the MIB information.

At operation S405, the terminal device determines a first synchronization raster from a plurality of synchronization rasters allowed in a channel bandwidth according to a predefined rule.

Figure 7:
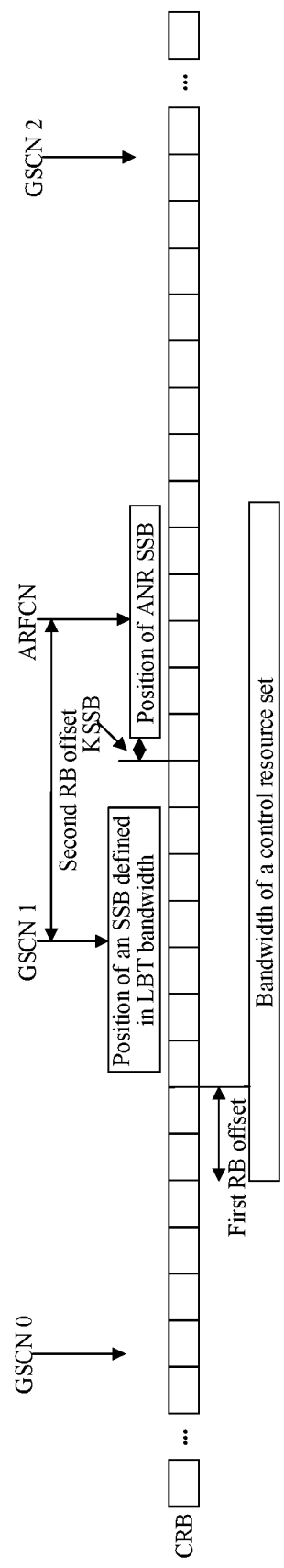
FIG. 7 is an optional schematic diagram of determining a first synchronization raster according to a predefined rule according to an embodiment of the present disclosure.

In an example, the predefined rule is that a synchronization raster corresponding to a frequency closest to the frequency position of the SSB detected by the terminal device in the channel bandwidth is the first synchronization raster, as shown in FIG. 7, predefined GSCNs in the channel bandwidth includes: GSCN0, GSCN1 and GSCN2. In a case that an ARFCN of the SSB is closest to GSCN1, the raster corresponding to GSCN1 is determined as the first synchronization raster.

In an example, the predefined rule is that the first synchronization raster is determined based on the PCI in the SSB detected by the terminal device. After receiving and demodulating the SSB, the terminal device obtains the PCI, and determines the first synchronization raster according to the predefined corresponding relationship between the PCI and the first synchronization raster. When the number of synchronization rasters allowed in the channel bandwidth is three, modulo operation is performed on the PCI, and the obtained result is 0, and the serial numbers of the three synchronization rasters allowed in the channel bandwidth respectively corresponding to 0, 1 and 2. Then, the synchronization raster corresponding to the serial number 0 is determined to be the first synchronization raster. Different PCIs may correspond to different first synchronization rasters.

At operation S406, the terminal device determines a second RB offset based on a frequency corresponding to the detected SSB and a frequency corresponding to the first synchronization raster.

In some embodiments, taking FIG. 7 as an example, the terminal device may determine the second RB offset based on a frequency offset between the GSCN1 and the ARFCN where the SS/PBCH block is located.

At operation S407, the terminal device determines a frequency position of the control resource set based on the first RB offset and the second RB offset.

It is to be noted that, in the embodiment of the present disclosure, S401 to S404, and S406 to S407 may be implemented on the basis of the related art, which will not be elaborated here.

In the embodiments of the present disclosure, the signaling overhead brought by indicating the first synchronization raster to the terminal device by the network device may be saved by predefining the first synchronization raster.

Figure 8:
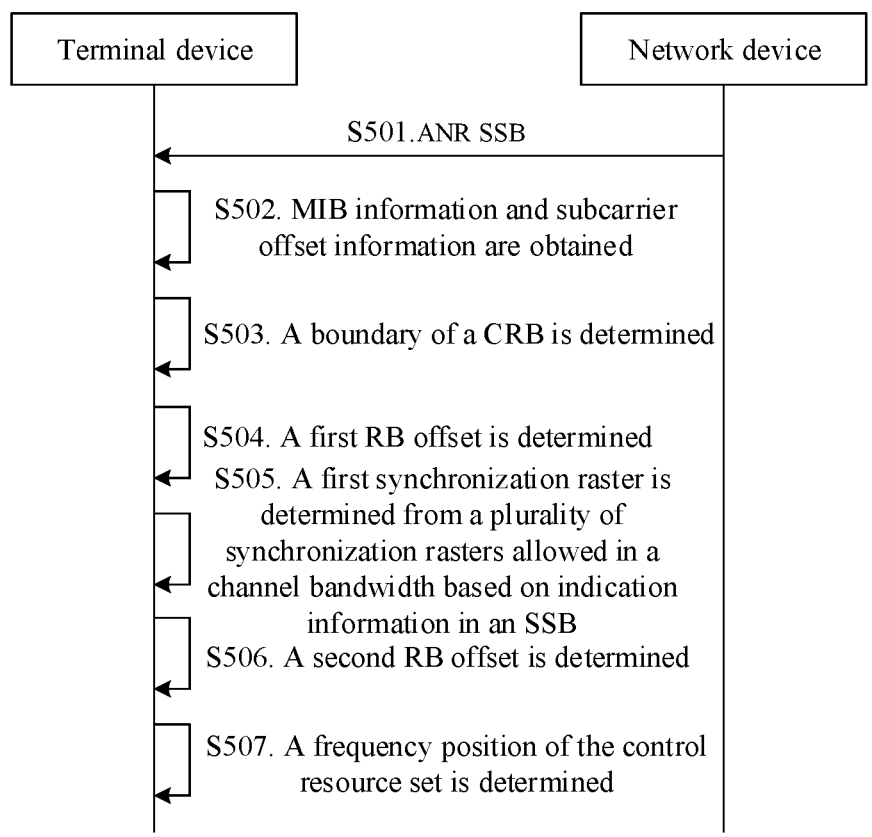
FIG. 8 is a schematic diagram of a detailed processing flow of another method for transmitting control information according to an embodiment of the present disclosure.

For the case that a first synchronization raster is determined based on indication information in an SSB, a detailed processing flow of another method for transmitting control information according to an embodiment of the present disclosure, as shown in FIG. 8, includes the following operations.

At operation S501, a network device sends an ANR SS/PBCH block to a terminal device, and the terminal device decodes the PBCH to obtain MIB information.

At operation S502, the terminal device obtains subcarrier offset information based on the MIB information.

At operation S503, the terminal device determines the boundary of a CRB based on the subcarrier offset information.

At operation S504, the terminal device determines a first RB offset based on information of a common control resource set in the MIB information.

At operation S505, the terminal device determines a first synchronization raster from a plurality of synchronization rasters allowed in a channel bandwidth based on indication information in the SSB.

In some embodiments, the SSB may include indication information, the indication information being configured to indicate a frequency position of the first synchronization raster.

In some embodiments, no specific limits are made to the indication manner of the indication information in the embodiments of the present disclosure. For example, in a case that the SSB is carried on a PBCH, the frequency position of the first synchronization raster may be indicated using a PBCH DMRS sequence, or the frequency position of the first synchronization raster may be indicated using bit information in an information field carried in the PBCH.

For example, the information carried by the PBCH may include high-level A-bit information and additional 8-bit information related to a physical layer. The information related to the physical layer includes an SFN, a half-frame indication, an SSB index, etc. Specific definitions may be as follows.

The bits carried by the PBCH may include high-level MIB information which has a total of A bits, $\bar{a}_0$, $\bar{a}_1$, $\bar{a}_2$, $a_3$, . . . , $\bar{a}_{\bar{A}-1}$, and include additional 8 bits related to the physical layer, $\bar{a}_{\bar{A}}$, $\bar{a}_{\bar{A}+1}$, $\bar{a}_{\bar{A}+2}$, $\bar{a}_{\bar{A}+3}$, . . . , $\bar{a}_{\bar{A}+7}$. The definition of the A-bit MIB information is described in the following standard that includes a 6-bit SFN, 1-bit subcarrier spacing information, a 4-bit subcarrier offset of the SSB, DMRS-related information, resource information of the PDCCH scheduling the SIB, etc., and also includes one idle bit. For the 8 bits related to the physical layer, $\bar{a}_{\bar{A}}$, $\bar{a}_{\bar{A}+1}$, $\bar{a}_{\bar{A}+2}$, $a_{\bar{A}+3}$, . . . , $\bar{a}_{\bar{A}+7}$, $\bar{a}_{\bar{A}}$, $\bar{a}_{\bar{A}+1}$, $\bar{a}_{\bar{A}+2}$, $\bar{a}_{\bar{A}+3}$ are the lowest 4 bits of the SFN and $\bar{a}_{\bar{A}+4}$ is the half-frame indication. When $L_{SSB}=64$, $a_{\bar{A}+5}$, $\bar{a}_{\bar{A}+6}$, $\bar{a}_{\bar{A}+7}$ are the highest 3 bits of the SSB index, otherwise $\bar{a}_{\bar{A}+5}$ is the highest bit of the parameter $k_{SSB}$, and $\bar{a}_{\bar{A}+6}$, $\bar{a}_{\bar{A}+7}$ are reserved bits. Herein, $L_{SSB}$ the maximum number of SSBs, and $k_{SSB}$ is the sub-carrier offset information of the SSB. When the system band is less than 6 GHz, that is, $L_{SSB}$ is less than 64, the layer 1 related information has 2 reserved bits.

In some embodiments, the SSB is not configured for initial access of the terminal device. The information carried by the PBCH may indicate other meanings, such as a position of one of the plurality of allowed synchronization rasters. For example, five synchronization rasters may be predefined in the channel bandwidth, and the position of one of the synchronization rasters may be indicated by the indication information of the SSB to calculate the second RB offset. No limits are made to the specific indication method in the PBCH here, such as the use of a PBCH DMRS sequence, the use of the bits in the above-mentioned information field carried in the PBCH, etc.

Figure 9:
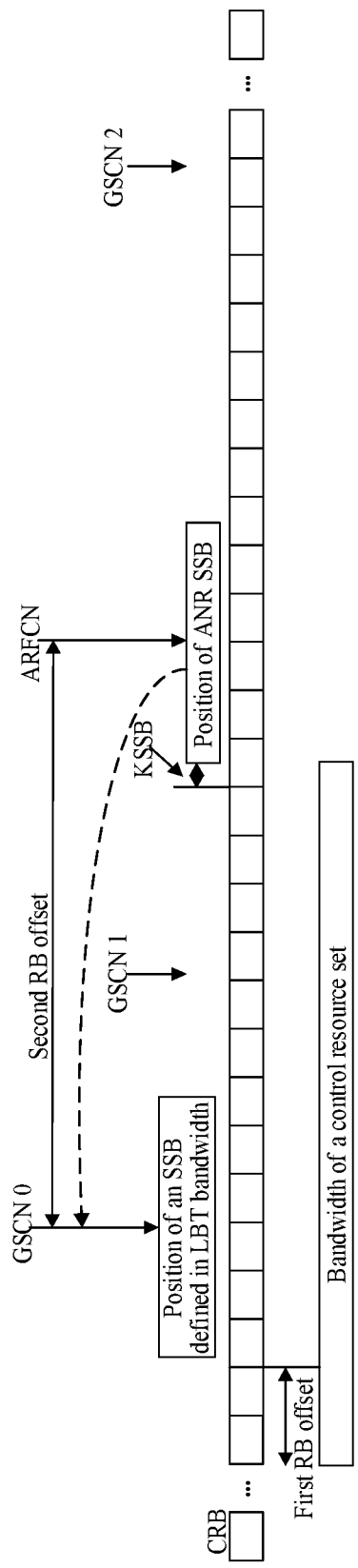
FIG. 9 is an optional schematic diagram of determining a first synchronization raster based on indication information of an SSB according to an embodiment of the present disclosure.

As shown in FIG. 9, predefined GSCNs in the channel bandwidth include: GSCN0, GSCN1 and GSCN2. The indication information of the SSB indicates that the frequency position of the first synchronization raster corresponds to GSCN0.

At operation S506, the terminal device determines the second RB offset based on the frequency corresponding to the detected SSB and the frequency corresponding to the first synchronization raster.

In some embodiments, taking FIG. 8 as an example, the terminal device may determine the second RB offset based on the frequency offset between the GSCN0 and the ARFCN where the SS/PBCH block is located.

At operation S507, the terminal device determines the frequency position of the control resource set based on the first RB offset and the second RB offset.

It is to be noted that, in the embodiment of the present disclosure, S501 to S504, and S506 to S507 may be implemented based on the related art, which will not be elaborated here.

In the embodiments of the present disclosure, the network device may flexibly indicate a position of a first synchronization raster through an SSB, so that the terminal device may determine the first synchronization raster from a plurality of synchronization rasters allowed in a channel bandwidth based on the indication of the SSB, thereby achieving flexible configuration of a control resource set.

It is to be noted that the SSB in the embodiments of the present disclosure may be an ANR SSB.

It should be understood that, in various embodiments of the present disclosure, in various embodiments of the present disclosure, a magnitude of a sequence number of each process does not mean an execution sequence and the execution sequence of each process should be determined by its function and an internal logic and should not form any limit to an implementation process of the embodiments of the present disclosure.

Figure 10:
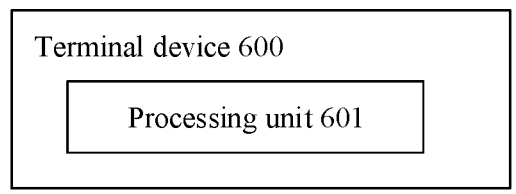
FIG. 10 is a schematic diagram of an optional composition structure of a terminal device according to an embodiment of the present disclosure.

In order to realize the method for transmitting control information provided by the embodiments of the present disclosure, the embodiments of the present disclosure also provide a terminal device. An optional composition structure of the terminal device 600, as shown in FIG. 10, includes: a processing unit 601.

The processing unit 601 is configured to determine a first synchronization raster from at least two synchronization rasters allowed in a channel bandwidth, and determine information of a control resource set based on the first synchronization raster.

In some embodiments, the first synchronization raster may be predefined. Alternatively, the first synchronization raster may be determined by indication information in an SSB detected by the terminal device.

In some embodiments, in the case that the first synchronization raster is predefined, the first synchronization raster may be a synchronization raster with the highest frequency among the synchronization rasters allowed in the channel bandwidth.

Alternatively, the first synchronization raster may be a synchronization raster with the lowest frequency among the synchronization rasters allowed in the channel bandwidth.

Alternatively, when N synchronization rasters are allowed in the channel bandwidth and N is an odd number, the first synchronization raster may be the (N+1)/2-th synchronization raster in the N synchronization rasters arranged in order of frequency size.

Alternatively, when N synchronization rasters are allowed in the channel bandwidth and N is an even number, the first synchronization raster may be the N/2-th synchronization raster in the N synchronization rasters arranged in order of frequency size.

Alternatively, when N synchronization rasters are allowed in the channel bandwidth and N is an even number, the first synchronization raster may be the (N/2+1)-th synchronization raster in the N synchronization rasters arranged in order of frequency size.

Alternatively, the first synchronization raster may be a synchronization raster satisfying a first relationship with the frequency position of the SSB detected by the terminal device.

Alternatively, the first synchronization raster may be determined based on a PCI in the SSB detected by the terminal device.

In some embodiments, the case that the first synchronization raster is the synchronization raster satisfying the first relationship with the frequency position of the SSB detected by the terminal device may include that: the first synchronization raster is a synchronization raster closest to the frequency position of the SSB among the synchronization rasters in the channel bandwidth; alternatively, the first synchronization raster is a synchronization raster farthest from the frequency position of the SSB among the synchronization rasters in the channel bandwidth.

In some embodiments, in the case that the first synchronization raster is determined by the indication information in the SSB detected by the terminal device, the indication information is configured to indicate a frequency position of the first synchronization raster.

In some embodiments, in the case that the first synchronization raster is determined based on the PCI in the SSB detected by the terminal device, the PCI may have a corresponding relationship with the first synchronization raster.

In some embodiments, the case that the PCI has a corresponding relationship with the first synchronization raster may include that: a modulo operation result obtained by performing a modulo operation on the PCI based on the number of synchronization rasters allowed in the channel bandwidth has the corresponding relationship with the serial number of the first synchronization raster.

In some embodiments, the serial number of the first synchronization raster may be obtained based on frequency positions from high to low of the synchronization rasters.

Alternatively, the serial number of the first synchronization raster may be obtained based on frequency positions from low to high of the synchronization rasters.

In some embodiments, the processing unit 601 is configured to determine a frequency domain position of the control resource set based on a second RB offset between a frequency corresponding to an SSB detected by the terminal device and a frequency corresponding to the first synchronization raster.

In some embodiments, the processing unit 601 is configured to determine the frequency domain position of the control resource set based on the second RB offset and a first RB offset.

In some embodiments, the first RB offset may be determined by MIB information in the SSB detected by the terminal device.

Figure 11:
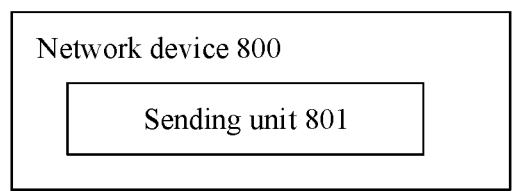
FIG. 11 is a schematic diagram of an optional composition structure of a network device according to an embodiment of the present disclosure.

In order to realize the method for transmitting control information provided by the embodiments of the present disclosure, the embodiments of the present disclosure also provide a network device. An optional composition structure of the network device 800, as shown in FIG. 11, includes: a sending unit 801.

The sending unit 801 is configured to send an SSB, the SSB being configured for a terminal device to determine a first synchronization raster from at least two synchronization rasters allowed in a channel bandwidth, and the first synchronization raster being configured to determine information of a control resource set.

In some embodiments, the SSB may include indication information, the indication information being configured to indicate a frequency position of the first synchronization raster.

In some embodiments, a PCI carried in the SSB is configured to determine the first synchronization raster.

In some embodiments, the PCI may have a corresponding relationship with the first synchronization raster.

In some embodiments, the case that the PCI has the corresponding relationship with the first synchronization raster may include that:
  a modulo operation result obtained by performing a modulo operation on the PCI based on the number of synchronization rasters allowed in the channel bandwidth has the corresponding relationship with the serial number of the first synchronization raster.

In some embodiments, the serial number of the first synchronization raster may be obtained based on frequency positions from high to low of the synchronization rasters.

Alternatively, the serial number of the first synchronization raster may be obtained based on frequency positions from low to high of the synchronization rasters.

The embodiments of the present disclosure further provide a terminal device, which includes: a processor and a memory configured to store a computer program runnable on the processor. Herein, the processor is configured to perform the operations of the method as implemented by the above terminal device for transmitting control information.

The embodiments of the present disclosure further provide a network device, which includes: a processor and a memory configured to store a computer program runnable on the processor. Herein, the processor is configured to perform the operations of the method as implemented by the above network device for transmitting control information.

The embodiments of the present disclosure further provide a chip, which includes: a processor, configured to call and run a computer program from a memory to enable a device installed with the chip to perform the method as implemented by the above terminal device for transmitting control information.

The embodiments of the present disclosure provide a chip, which includes: a processor, configured to call and run a computer program from a memory to enable a device installed with the chip to perform the method as implemented by the above network device for transmitting control information.

The embodiments of the present disclosure further provide a storage medium, storing an executable program. The executable program, when run by a processor, executes the method as implemented by the above terminal device for transmitting control information.

The embodiments of the present disclosure further provide a storage medium, storing an executable program. The executable program, when run by a processor, executes the method as implemented by the above network device for transmitting control information.

The embodiments of the present disclosure further provide a computer program product, which includes: a computer program instruction. The computer program instruction enables a computer to execute the method as implemented by the above terminal device for transmitting control information.

The embodiments of the present disclosure further provide a computer program product, which includes: a computer program instruction. The computer program instruction enables a computer to execute the method as implemented by the above network device for transmitting control information.

The embodiments of the present disclosure further provide a computer program, enabling a computer to execute the method as implemented by the above terminal device for transmitting control information.

The embodiments of the present disclosure further provide a computer program, enabling a computer to perform the method as implemented by the above network device for transmitting control information.

Figure 12:
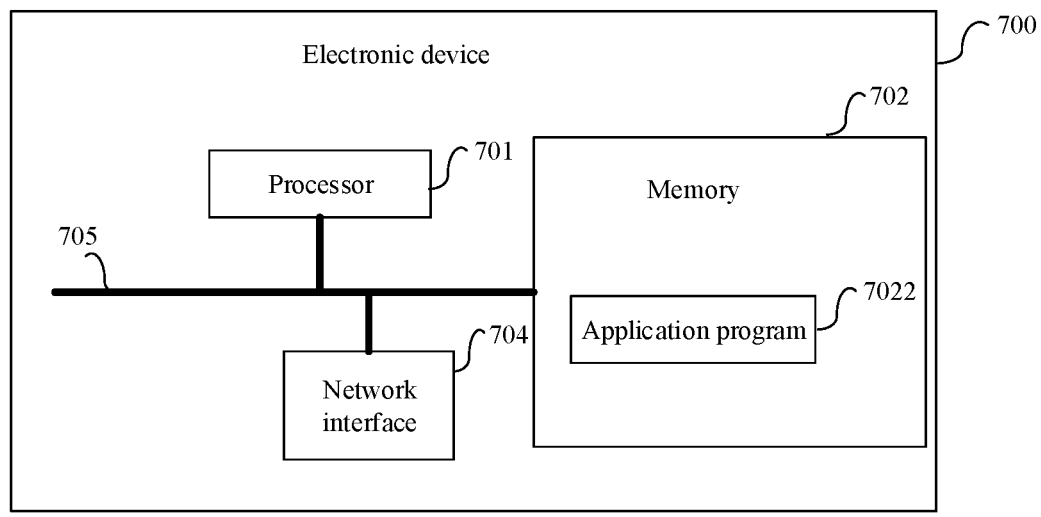
FIG. 12 is a schematic diagram of a hardware composition structure of an electronic device according to an embodiment of the present disclosure.

FIG. 12 is a schematic structural diagram of hardware compositions of an electronic device (terminal device or network device) of an embodiment of the present disclosure. The terminal device 700 includes: at least one processor 701, a memory 702, and at least one network interface 704. Various components of the terminal device 700 are coupled together through a bus system 705. It should be understood that the bus system 705 is configured to implement connection and communication between these components. In addition to a data bus, the bus system 705 further includes a power bus, a control bus, and a status signal bus. However, for clarity of description, various buses are marked as the bus system 705 in FIG. 12.

It should be understood that the memory 702 may be a volatile memory or a non-volatile memory, or may include both a volatile memory and a non-volatile memory. Herein, the non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a Flash Memory, a magnetic surface memory, an optical disk or a Compact Disc Read-Only Memory (CD-ROM); and the magnetic surface memory may be a magnetic disk memory or a magnetic tape memory. The volatile memory may be a RAM that acts as an external cache. By way of example and not limitation, many forms of RAM are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 702 described in the embodiment of the present disclosure is intended to include, but is not limited to, these and any other suitable types of memories.

The memory 702 in the embodiment of the present disclosure is configured to store various types of data to support operation of the electronic device 700. Examples of such data include: any computer application operated on the electronic device 700, such as an application program 7022. A program for implementing the method in the embodiment of the present disclosure may be included in the present disclosure program 7022.

The method disclosed in the above embodiment of the present disclosure may be applied to the processor 701, or may be implemented by the processor 701. The processor 701 may be an integrated circuit chip with signal processing capability. During implementation, the operations of the above method may be completed by hardware integrated logic circuits in the processor 701 or instructions in the form of software. The above processor 701 may be a general-purpose processor, a Digital Signal Processor (DSP), or other programmable logic devices, discrete gate or transistor logic devices, discrete hardware components, or the like. The processor 701 may implement or perform various methods, operations, and logical block diagrams disclosed in the embodiments of the present disclosure. The general-purpose processor may be a microprocessor, or any conventional processor. Steps of the methods disclosed with reference to the embodiments of the present disclosure may be directly performed and accomplished by a hardware decoding processor, or may be performed and accomplished by a combination of hardware and software modules in the decoding processor. A software module may be located in a storage medium. The storage medium is located in the memory 702, and the processor 701 reads information in the memory 702 and completes the operations of the above method in combination with hardware thereof.

In an exemplary embodiment, the electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs, or other electronic elements for executing the above methods.

The present disclosure is described with reference to flowcharts and/or block diagrams of the method, the device (system) and the computer program product according to the embodiments of the present disclosure. It should be understood that each flow and/or block in the flowcharts and/or the block diagrams and a combination of the flows and/or the blocks in the flowcharts and/or the block diagrams may be implemented by computer program instructions. These computer program instructions may be provided for a general-purpose computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, so that a manufactured product including an instruction apparatus is generated via the instructions stored in the computer readable memory, and the instruction apparatus achieves the functions designated in one or more flows of the flowcharts and/or one or more blocks of the block diagrams.

These computer program instructions may also be loaded to the computers or the other programmable data processing devices, so that processing implemented by the computers is generated by executing a series of operation operations on the computers or the other programmable devices, and therefore the instructions executed on the computers or the other programmable devices provide an operation of achieving the functions designated in one or more flows of the flowcharts and/or one or more blocks of the block diagrams.

It should be understood that the terms "system" and "network" in the present disclosure are often used interchangeably herein. The term "and/or" in this application describes only an association relationship for describing associated objects and represents that three relationships may exist. For example, A and/or B may represent the following three cases: Only A exists, both A and B exist, and only B exists. In addition, the character "/" in the present disclosure generally indicates an "or" relationship between the associated objects.

The description above is only the preferred embodiment of the present disclosure and is not intended to limit the scope of protection of the present disclosure. Any modifications, equivalent replacements, improvements and the like made within the spirit and principle of the present disclosure shall fall within the scope of protection of the present disclosure.

The invention claimed is:

1. A method for transmitting control information, comprising:
    determining, by a terminal device, a first synchronization raster from at least two synchronization rasters allowed in a channel bandwidth; and
    determining information of a control resource set based on the first synchronization raster,
    wherein
    the first synchronization raster is determined based on a physical cell identifier PCI) in a synchronization signal block (SSB) detected by the terminal device, wherein a modulo operation result obtained by performing a modulo operation on the PCI based on a number of the at least two synchronization rasters allowed in the channel bandwidth has a corresponding relationship with a serial number of the first synchronization raster.

2. The method of claim 1, wherein the SSB comprises indication information configured to indicate a frequency position of the first synchronization raster.

3. The method of claim 1, wherein determining the information of the control resource set based on the first synchronization raster comprises:
    determining a frequency domain position of the control resource set based on a second resource block (RB) offset between a frequency corresponding to an SSB detected by the terminal device and a frequency corresponding to the first synchronization raster.

4. The method of claim 3, wherein determining the frequency domain position of the control resource set based on the second RB offset between the frequency corresponding to the SSB detected by the terminal device and the frequency corresponding to the first synchronization raster comprises:

determining the frequency domain position of the control resource set based on the second RB offset and a first RB offset.

5. The method of claim 4, wherein the first RB offset is determined based on master information block (MIB) information in the SSB detected by the terminal device.

6. A method for transmitting control information, comprising:
sending, by a network device, a synchronization signal block (SSB), the SSB being configured for a terminal device to determine a first synchronization raster from at least two synchronization rasters allowed in a channel bandwidth, and the first synchronization raster being configured to determine information of a control resource set,
wherein
the first synchronization raster is determined based on a physical cell identifier (PCI) in a synchronization signal block (SSB) detected by the terminal device, wherein a modulo operation result obtained by performing a modulo operation on the PCI based on a number of the at least two synchronization rasters allowed in the channel bandwidth has a corresponding relationship with a serial number of the first synchronization raster.

7. The method of claim 6, wherein the SSB comprises indication information, the indication information being configured to indicate a frequency position of the first synchronization raster.

8. A network device, comprising:
a processor; and
a memory configured to store a computer program runnable on the processor,
wherein the processor is configured to perform the operations of the method for transmitting control information according to claim 6.

9. The network device of claim 8, wherein the SSB comprises indication information, the indication information being configured to indicate a frequency position of the first synchronization raster.

10. A terminal device, comprising:
a processor; and
a memory configured to store a computer program runnable on the processor,
wherein the processor is configured to determine a first synchronization raster from at least two synchronization rasters allowed in a channel bandwidth, and determine information of a control resource set based on the first synchronization raster,
wherein
the first synchronization raster is determined based on a physical cell identifier (PCI) in a synchronization signal block (SSB) detected by the terminal device, wherein a modulo operation result obtained by performing a modulo operation on the PCI based on a number of the at least two synchronization rasters allowed in the channel bandwidth has a corresponding relationship with a serial number of the first synchronization raster.

11. The terminal device of claim 10, wherein the SSB comprises indication information configured to indicate a frequency position of the first synchronization raster.

12. The terminal device of claim 10, wherein
the processor is configured to determine a frequency domain position of the control resource set based on a second resource block (RB) offset between a frequency corresponding to an SSB detected by the terminal device and a frequency corresponding to the first synchronization raster.

13. The terminal device of claim 12, wherein the processor is configured to determine the frequency domain position of the control resource set based on the second RB offset and a first RB offset.

14. The terminal device of claim 13, wherein the first RB offset is determined based on master information block (MIB) information in the SSB detected by the terminal device.

* * * * *